US012101495B2

(12) United States Patent
Huo et al.

(10) Patent No.: US 12,101,495 B2
(45) Date of Patent: Sep. 24, 2024

(54) COLOUR COMPONENT PREDICTION METHOD, ENCODER, DECODER, AND COMPUTER STORAGE MEDIUM

(71) Applicant: GUANGDONG OPPO MOBILE TELECOMMUNICATIONS CORP., LTD., Guangdong (CN)

(72) Inventors: Junyan Huo, Guangdong (CN); Shuai Wan, Guangdong (CN); Yanzhuo Ma, Guangdong (CN); Wei Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 271 days.

(21) Appl. No.: 17/477,193

(22) Filed: Sep. 16, 2021

(65) Prior Publication Data

US 2022/0007042 A1 Jan. 6, 2022

Related U.S. Application Data

(63) Continuation of application No. PCT/CN2019/124114, filed on Dec. 9, 2019.

(60) Provisional application No. 62/823,621, filed on Mar. 25, 2019.

(51) Int. Cl.
*H04N 19/44* (2014.01)
*H04N 19/132* (2014.01)
*H04N 19/176* (2014.01)
*H04N 19/186* (2014.01)

(52) U.S. Cl.
CPC ........... *H04N 19/44* (2014.11); *H04N 19/132* (2014.11); *H04N 19/176* (2014.11); *H04N 19/186* (2014.11)

(58) Field of Classification Search
CPC .......................... H04N 19/44; H04N 19/132
See application file for complete search history.

(56) References Cited

U.S. PATENT DOCUMENTS

| | | | |
|---|---|---|---|
| 5,619,590 | A | 4/1997 | Moore, Jr. |
| 8,718,130 | B2 | 5/2014 | Xiong |
| 9,462,273 | B2 | 10/2016 | Zhang et al. |
| 9,544,609 | B2 | 1/2017 | Nakagawa et al. |
| 9,900,601 | B2 | 2/2018 | Zhang et al. |
| 10,313,677 | B2 | 6/2019 | Zhang et al. |

(Continued)

FOREIGN PATENT DOCUMENTS

| | | |
|---|---|---|
| CN | 1859576 A | 11/2006 |
| CN | 101335902 A | 12/2008 |

(Continued)

OTHER PUBLICATIONS

Chen et al. "Algorithm description of Joint Exploration Test Model 7 (JEM7)" JVET-G1001-v1, 7th Meeting: Torino, IT, Jul. 13-21, 2017. 48 pages.

(Continued)

*Primary Examiner* — Irfan Habib
(74) *Attorney, Agent, or Firm* — Perkins Coie LLP

(57) ABSTRACT

An image component prediction method, an encoder, and a computer storage medium are provided. The method includes: encoding chroma components in a colour component encoding process; and acquiring a prediction value of a luma component according to the encoded chroma components.

12 Claims, 8 Drawing Sheets

(56) References Cited

U.S. PATENT DOCUMENTS

| | | | |
|---|---|---|---|
| 10,455,236 B2 | 10/2019 | Zhang et al. | |
| 10,506,243 B2* | 12/2019 | Kim | H04N 19/126 |
| 11,218,701 B2* | 1/2022 | Huo | H04N 19/186 |
| 11,272,186 B2* | 3/2022 | Wan | H04N 19/146 |
| 11,330,290 B2* | 5/2022 | Lee | H04N 19/70 |
| 11,451,792 B2* | 9/2022 | Huo | H04N 19/463 |
| 11,477,439 B2* | 10/2022 | Kim | H04N 19/105 |
| 11,627,342 B2* | 4/2023 | Wan | H04N 19/186 375/240.02 |
| 2008/0205513 A1 | 8/2008 | Xiong | |
| 2013/0188686 A1 | 7/2013 | Tourapis | |
| 2013/0188703 A1* | 7/2013 | Liu | H04N 19/50 375/240.12 |
| 2014/0233650 A1 | 8/2014 | Zhang et al. | |
| 2015/0098510 A1 | 4/2015 | Ye et al. | |
| 2015/0365677 A1 | 12/2015 | Nakagawa et al. | |
| 2016/0065974 A1 | 3/2016 | Alshina et al. | |
| 2016/0156912 A1 | 6/2016 | Alshina et al. | |
| 2016/0277762 A1* | 9/2016 | Zhang | H04N 19/593 |
| 2016/0373765 A1 | 12/2016 | Zhang et al. | |
| 2017/0150183 A1* | 5/2017 | Zhang | H04N 19/59 |
| 2017/0295365 A1* | 10/2017 | Budagavi | H04N 19/167 |
| 2017/0352062 A1 | 12/2017 | Vermeir | |
| 2017/0359595 A1* | 12/2017 | Zhang | H04N 19/186 |
| 2017/0366818 A1* | 12/2017 | Zhang | H04N 19/159 |
| 2018/0048889 A1* | 2/2018 | Zhang | H04N 19/159 |
| 2018/0063527 A1* | 3/2018 | Chen | H04N 19/117 |
| 2018/0077426 A1* | 3/2018 | Zhang | H04N 19/157 |
| 2018/0131944 A1 | 5/2018 | Zhang et al. | |
| 2018/0205946 A1* | 7/2018 | Zhang | H04N 19/103 |
| 2019/0014348 A1 | 1/2019 | Ye et al. | |
| 2019/0045184 A1* | 2/2019 | Zhang | H04N 19/186 |
| 2019/0268602 A1 | 8/2019 | Zhang et al. | |
| 2020/0195930 A1* | 6/2020 | Choi | H04N 19/186 |
| 2020/0413062 A1* | 12/2020 | Onno | H04N 19/186 |
| 2020/0413069 A1* | 12/2020 | Lim | H04N 19/593 |
| 2021/0136392 A1* | 5/2021 | Ma | H04N 19/157 |
| 2023/0336776 A1* | 10/2023 | Gao | H04N 19/59 |

FOREIGN PATENT DOCUMENTS

| | | | |
|---|---|---|---|
| CN | 101335902 | B | 6/2010 |
| CN | 103096055 | A | 5/2013 |
| CN | 107211115 | A | 9/2017 |
| JP | 2018107692 | A | 7/2018 |
| JP | 2020526956 | A | 8/2020 |
| JP | 2020533822 | A | 11/2020 |
| WO | 2015053112 | A1 | 4/2015 |
| WO | 2018221631 | A1 | 12/2018 |
| WO | 2019006105 | A1 | 1/2019 |
| WO | 2019009540 | A1 | 1/2019 |

OTHER PUBLICATIONS

Examination Report of the Indian application No. 202117042763, issued on May 18, 2022. 6 pages with English Translation.
Extended European Search Report of the European application No. 19920890.1, issued on Jun. 20, 2022. 9 pages.
Written Opinion of the PCT application No. PCT/CN2019/124114, issued on Mar. 13, 2020. 8 pages with English Translation.
Zhang et al. "Enhanced Cross-Component Linear Model for Chroma Intra-Prediction in Video Coding" IEEE Transactions on Image Processing, vol. 27, No. 8, Aug. 2018. pp. 3983-3997. 15 pages.
Zhang et al. "Multi-model Based Cross-component Linear Model Chroma Intra-prediction for Video Coding", Dec. 10-13, 2017, St Petersburg, U.S.A. 4 pages.
First Office Action of the Chinese application No. 202111093518.0, issued on Nov. 18, 2022. 14 pages with English translation.
International Search Report in the international application No. PCT/CN2019/124114, mailed on Mar. 13, 2020.
Oral Proceedings of the European application No. 19920890.1, issued on Sep. 8, 2023. 8 pages.
First Office Action of the Indonesian application No. P00202109005, issued on Oct. 24, 2023. 3 pages.
Yongjian Wang et al., Upsampling Design for Next Generation Scalable Video Coding, TV technology, the 23rd, Dec. 2, 2015.
Notice of Allowance of the Chinese application No. 202111093518.0, issued on Apr. 13, 2023.
Woo-Shik Kim et al: "Inter-plane prediction for RGB video coding", Image Processing, 2004. ICIP '04. 2004 International Conference on Singapore Oct. 24-27, 2004, Piscataway, NJ, USA, IEEE, vol. 2, Oct. 24, 2004 (Oct. 24, 2004), pp. 785-788, XP010785120, DOI: 10.1109/ICIP.2004.1419415, ISBN: 978-0-7803-8554-2.
First Office Action of the European application No. 19920890.1, issued on Mar. 2, 2023.
Jianle Chen et al., "Algorithm Description of Joint Exploration TestModel 3", Joint Video Exploration Team (JVET) of ITU-T SG 16 WP 3 and ISO/IEC JTC 1/SC 29/WG 11, JVET-C1001_v3, 3rd Meeting: Geneva, CH, May 26-Jun. 1, 2016, p. 1,8-9, 37 pages.
Kei Kawamura et al., "Block adaptive CCLM residual prediction", Joint Video Exploration Team (JVET) of ITU-T SG 16 WP 3 and ISO/IEC JTC 1/SC 29/WG 11, JVET-E0103_r1, 5th Meeting: Geneva, CH, Jan. 12-20, 2017, the whole document, 3 pages.
First Office Action of the Japanese application No. 2021-556939, issued on Jan. 5, 2024, 11 pages with English translation.
Second Office Action of the Indonesian application No. P00202109005, issued on Jan. 18, 2024, 3 pages with English translation.
Hearing Notice of the Indian application No. 202117042763, issued on Mar. 18, 2024, 2 pages with English translation.
Second Office Action of the Japanese application No. 2021-556939, issued on Jun. 25, 2024, 10 pages with English translation.

* cited by examiner

COLOUR COMPONENT PREDICTION METHOD, ENCODER, DECODER, AND COMPUTER STORAGE MEDIUM

CROSS-REFERENCE TO RELATED APPLICATIONS

The present disclosure is a U.S. continuation application of International Application No. PCT/CN2019/124114, filed on Dec. 9, 2019, which claims priority to U.S. Patent Application No. 62/823,621, filed with the United States Patent and Trademark Office on Mar. 25, 2019. The contents of the International Application No. PCT/CN2019/124114 and the U.S. Patent Application No. 62/823,621 are incorporated herein by reference in their entirety.

BACKGROUND

In a next-generation video coding standard H.266 or Versatile Video Coding (VVC), Cross-Component Prediction (CCP) may be implemented by color Cross-Component Linear Model Prediction (CCLM). By CCP, a chroma component may be predicted through a luma component based on dependence between components.

At present, the luma component which is used for prediction is required to be down-sampled to the same resolution as the chroma components that are required to be predicted, and then prediction is performed at the same resolution between luma and chroma, thereby implementing prediction from the luma component to one of chroma components.

SUMMARY

Embodiments of the application relate to an intra prediction technology in the field of video coding, and particularly to a method for predicting colour components, an encoder, a decoder, and a computer storage medium.

The embodiments of the application provide a method for predicting colour components, an encoder, a decoder, and a computer storage medium. Predictive coding from chroma components to a luma component may be implemented, the prediction accuracy of the luma component may be improved, and a prediction value of the luma component is more approximate to a real pixel value of the luma component.

The technical solutions of the embodiments of the application may be implemented as follows.

According to a first aspect, the embodiments of the application provide a method for predicting colour components, which includes the following operations.

Chroma components are encoded in a colour component encoding process.

A prediction value of a luma component is acquired according to the encoded chroma components.

According to a second aspect, the embodiments of the application provide a method for predicting colour components, which includes the following operations.

Chroma components are decoded in a colour component decoding process.

A prediction value of a luma component is acquired according to the decoded chroma components.

According to a third aspect, the embodiments of the application provide an encoder, which includes an encoding module and a first acquisition module.

The encoding module is configured to encode chroma components in a colour component encoding process.

The first acquisition module is configured to acquire a prediction value of a luma component according to the encoded chroma components.

According to a fourth aspect, the embodiments of the application provide a decoder, which includes a decoding module and a second acquisition module.

The decoding module is configured to decode chroma components in a colour component decoding process.

The second acquisition module is configured to acquire a prediction value of a luma component according to the decoded chroma components.

According to a fifth aspect, the embodiments of the application provide an encoder, which may include a processor and a storage medium storing instructions executable for the processor. The storage medium executes operations dependently on the processor through a communication bus. When the instructions are executed by the processor, the processor is configured to execute the method for predicting colour components as described in one or more abovementioned embodiments.

According to a sixth aspect, the embodiments of the application provide a decoder, which may include a processor and a storage medium storing instructions executable for the processor. The storage medium executes operations dependently on the processor through a communication bus. When the instructions are executed by the processor, the processor is configured to execute the method for predicting colour components as described in one or more abovementioned embodiments.

According to a seventh aspect, the embodiments of the application provide a computer-readable storage medium, which stores executable instructions. When the executable instructions are executed by one or more processors, the one or more processors execute the method for predicting colour components as described in one or more abovementioned embodiments.

DETAILED DESCRIPTION

Figure 1:
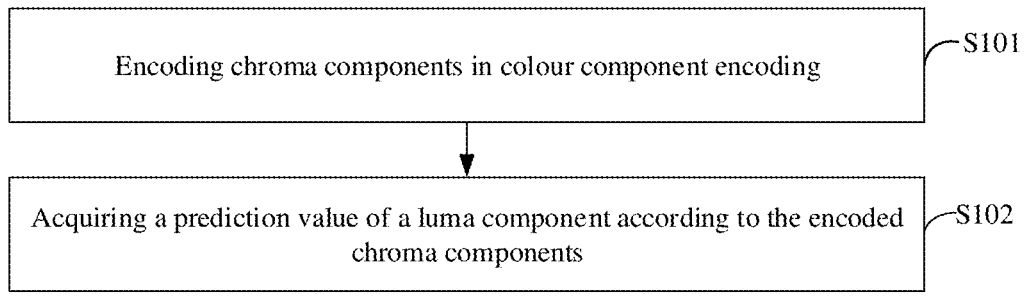
FIG. 1 is an optional schematic flowchart of a method for predicting colour components according to some embodiments of the application.

The technical solutions in the embodiments of the application will be clearly and completely described below in combination with the drawings in the embodiments of the application. It is to be understood that the specific embodiments described here are adopted not to limit the related application but only to explain the application. In addition, it is also to be noted that, for convenient description, only parts related to the application are illustrated in the drawings.

In the prior art, the luma component has rich texture, while the chroma components are flatter. When the chroma components are predicted by using the luma component, a deviation between the predicted chroma component and a real chroma value is relatively great, resulting in relatively low accuracy of a prediction value and further influencing the efficiencies for encoding and decoding.

The embodiments of the application provide a method for predicting colour components, an encoder, a decoder, and a computer storage medium. The method includes that: the chroma components are coded in colour component coding, and the prediction value of the luma component is acquired according to the coded chroma components. That is, in the embodiments of the application, the chroma components are encoded/decoded at first, and then the luma component is predicted through the encoded/decoded chroma components. In this manner, the luma component is predicted through the encoded/decoded chroma components, namely the relatively flat chroma components are encoded/decoded at first, and then the luma component having rich texture is predicted based on the encoded/decoded chroma components, so that the prediction accuracy of the luma component may be improved, and the prediction value of the luma component is more approximate to a real pixel value of the luma component.

Embodiment 1

In a video picture, a first colour component, a second colour component, and a third colour component are usually adopted to represent a block. The first colour component, the second colour component, and the third colour component may include a luma component and two chroma components. Specifically, the luma component is usually represented by sign Y, and the chroma components are usually represented by signs Cb and Cr, Cb representing a blue chroma component, and Cr representing a red chroma component.

It is to be noted that, in some embodiments of the application, the first clolour component, the second clolour component, and the third clolour component may be the luma component Y, the blue chroma component Cb, and the red chroma component Cr respectively. For example, the first clolour component may be the luma component Y, the second clolour component may be the red chroma component Cr, and the third clolour component may be the blue chroma component Cb. However, no specific limits are made thereto in the embodiments of the application.

Furthermore, in some embodiments of the application, a common sampling format that the luma component and the chroma components are represented separately is also called a YCbCr format. The YCbCr format may include a 4:4:4 format, a 4:2:2 format, and a 4:2:0 format.

Under the condition that the 4:2:0 YCbCr format is adopted for a video picture, if a luma component of the video picture is a current block with a 2N×2N size, a corresponding chroma component is a current block with an N×N size, N being a side length of the current block. In the embodiments of the application, descriptions will be made with the 4:2:0 format as an example. However, the technical solutions of the embodiments of the application are also applied to other sampling formats.

In H.266, for further improving the coding performance and the coding efficiency, CCP is extended and improved, and CCLM is proposed. In H.266, CCLM implements prediction from the first colour component to the second colour component, prediction from the first colour component to the third colour component, and prediction from the second colour component to the third colour component.

However, for CCLM, a luma component of a current block is predicted at first, and then chroma components are predicted through the luma component. However, the luma component has rich texture, while the chroma component is flatter. When the chroma components are predicted using the luma component, a deviation between the predicted chroma component and a real chroma value is relatively great, resulting in relatively low accuracy of a prediction value and further influencing the efficiencies for encoding and decoding.

The embodiments of the application provide a method for predicting colour components. FIG. 1 is an optional schematic flowchart of a method for predicting colour components according to some embodiments of the application. As shown in FIG. 1, the method may include the following operations.

In S101, chroma components are encoded in colour component encoding.

In S102, a prediction value of a luma component is acquired according to the encoded chroma components.

Figure 2:
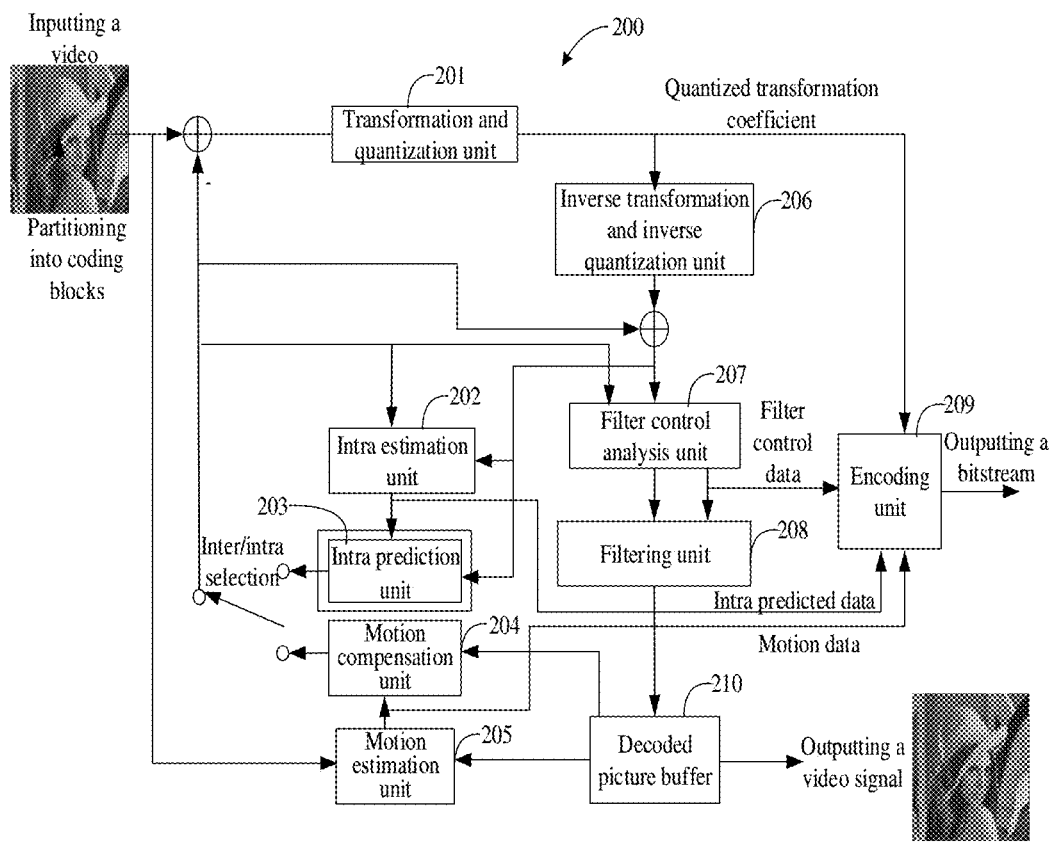
FIG. 2 is a structure diagram of a video encoding system.

The method for predicting colour components provided in the embodiments of the application may be applied to an encoder or a decoder. FIG. 2 is a structure diagram of a video encoding system. As shown in FIG. 2, the video encoding system 200 includes a transformation and quantization unit 201, an intra estimation unit 202, an intra prediction unit 203, a motion compensation unit 204, a motion estimation unit 205, an inverse transformation and inverse quantization unit 206, a filter control analysis unit 207, a filtering unit 208, an encoding unit 209, a decoded picture buffer 210, etc. The filtering unit 208 may implement deblocking filtering and Sample Adaptive Offset (SAO) filtering. The encoding unit 209 may implement header information coding and Context-based Adaptive Binary Arithmetic Coding (CABAC). For an input original video signal, a video coding block may be obtained by partition of a Coding Tree Unit (CTU), and then residual pixel information obtained by intra prediction or inter prediction is processed through the transformation and quantization unit 201 to transform the video coding block, including transforming the residual information from a pixel domain to a transformation domain and quantizing an obtained transformation coefficient to further reduce a bit rate. The intra estimation unit 202 and the intra prediction unit 203 are configured to perform intra prediction on the video coding block. Exactly, the intra estimation unit 202 and the intra prediction unit 203 are configured to determine an intra prediction mode to be adopted to encoding the video coding block. The motion compensation unit 204 and the motion estimation unit 205 are configured to execute intra prediction encoding on the received video coding block relative to one or more blocks in one or more reference frames to provide time prediction information. Motion estimation executed by the motion estimation unit 205 is a process of generating a motion vector. A motion of the video coding block may be estimated according to the motion vector, and then the motion compensation unit 204 executes motion compensation based on the motion vector determined by the motion estimation unit 205. After the intra prediction mode is determined, the intra prediction unit 203 is further configured to provide the selected intra prediction data to the encoding unit 209, and the motion estimation unit 205 also sends motion vector data determined by calculation to the encoding unit 209. In addition, the inverse transformation and inverse quantization unit 206 is configured to reconstruct the video coding block, namely a residual block is reconstructed in the pixel domain, an artifact with a blocking effect in the reconstructed residual block is removed through the filter control analysis unit 207 and the filter unit 208 and then the reconstructed residual block is added to a predictive block in a frame of the decoded picture buffer 210 to generate a reconstructed video coding block. The encoding unit 209 is configured to encode various coding parameters and quantized transformation coefficients. In a CABAC-based coding algorithm, a context content may be configured to code information indicating the determined intra prediction mode based on neighbouring coding blocks to output a bitstream of the video signal. The decoded picture buffer 210 is configured to store the reconstructed video coding block as a prediction reference. As video pictures are coded, new reconstructed video coding blocks may be continuously generated, and all these reconstructed video coding blocks may be stored in the decoded picture buffer 210.

Figure 3:
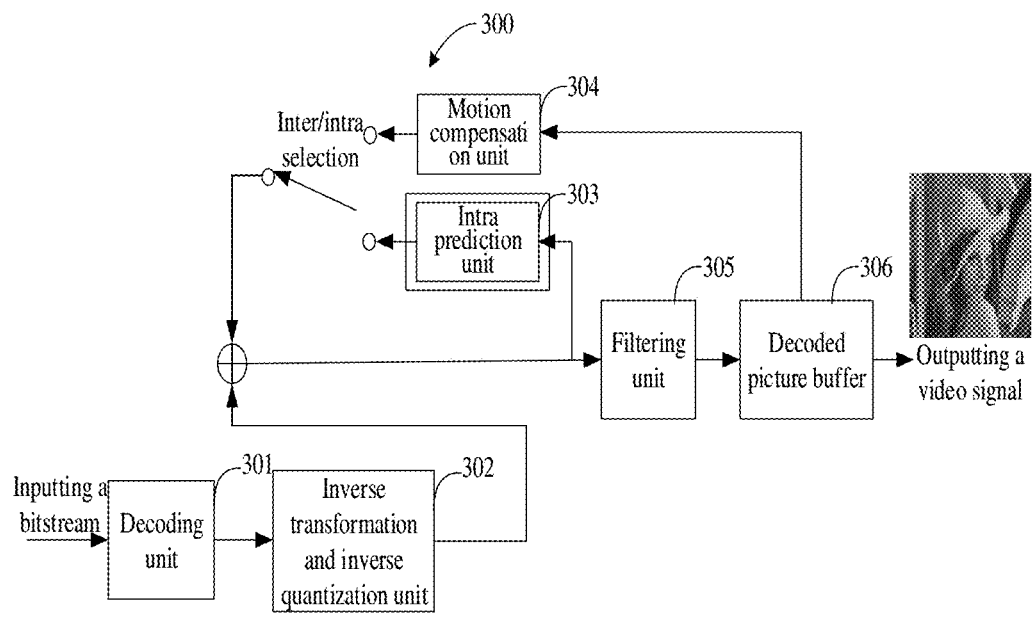
FIG. 3 is a structure diagram of a video decoding system.

FIG. 3 is a structure diagram of a video decoding system. As shown in FIG. 3, the video decoding system 300 includes a decoding unit 301, an inverse transformation and inverse quantization unit 302, an intra prediction unit 303, a motion compensation unit 304, a filter unit 305, a decoded picture buffer 306, etc. The decoding unit 301 may implement header information decoding and CABAC decoding. The filtering unit 305 may implement deblocking filtering and SAO filtering. After the encoding processing shown in FIG. 2 is performed on an input video signal, a bitstream of the video signal is output. The bitstream is input to the video decoding system 300, and is processed through the decoding unit 301 at first to obtain a decoded transformation coefficient. A residual block is generated in a pixel domain by processing of the inverse transformation and inverse quantization unit 302 for the transformation coefficient. The intra prediction unit 303 may be configured to generate prediction data of a current video decoding block based on a determined intra prediction mode and data of a previous decoded block from a current frame or picture. The motion compensation unit 305 analyzes a motion vector and another associated syntactic element to determine prediction information for the video decoding block and generates a predictive block of the video decoding block that is currently decoded by use of the prediction information. The residual block from the inverse transformation and inverse quantization unit 302 and the corresponding predictive block generated by the intra prediction unit 303 or the motion compensation unit 304 are summed to form a decoded video block. An artifact with a blocking effect in the decoded video signal may be removed through the filtering unit 305 to improve the video quality. Then, the decoded video block is stored in the decoded picture buffer 306. The decoded picture buffer 306 stores a reference picture for subsequent intra prediction or motion compensation and is also configured to output a video signal, namely the recovered original video signal is obtained.

It is to be noted that S101 and S102 in the embodiments of the application are mainly applied to the intra prediction unit 203 shown in FIG. 2 and the intra prediction unit 303 shown in FIG. 3. That is, the embodiments of the application may be applied to the encoder and the decoder at the same time. However, no specific limits are made thereto in the embodiments of the application.

In addition, in S101 and S102, in colour component coding, one chroma component is coded, and then the luma component is predicted using the chroma component. Alternatively, one chroma component is coded and then another chroma component is predicted using the chroma component, or two chroma components are coded at first, and then the luma component is predicted by using one chroma component, or the luma component is predicted by using the two chroma components. Here, no specific limits are made thereto in the embodiments of the application.

For obtaining the prediction value of the luma component, in an optional embodiment, S102 may include the following operation.

Prediction is performed according to a first chroma component in the encoded chroma components and a second chroma component in the encoded chroma components to obtain the prediction value of the luma component.

When the first chroma component is a blue chroma component, the second chroma component is a red chroma component. When the first chroma component is the red chroma component, the second chroma component is the blue chroma component.

Here, the prediction value of the luma component is derived by using the first chroma component in the encoded chroma components and the encoded second chroma component. For example, if the first chroma component is Cb, the second chroma component is Cr, and the luma component is Y, Y may be predicted through Cb and Cr. Alternatively, if the first chroma component is Cr, the second chroma component is Cb, and the luma component is Y, Y may be predicted through Cb and Cr.

Furthermore, for predicting the prediction value of the luma component, in an optional embodiment, the operation that prediction is performed according to the first chroma component in the encoded chroma components and the second chroma component in the encoded chroma component to obtain the prediction value of the luma component includes the following operations.

For a current block, a reconstructed value of the first chroma component, a reconstructed value of the second chroma component, a neighbouring reference value of the first chroma component, a neighbouring reference value of the second chroma component, and a neighbouring reference value of the luma component are acquired.

Prediction is performed according to the reconstructed value of the first chroma component, the neighbouring reference value of the first chroma component, and the neighbouring reference value of the luma component to obtain a first prediction value of the luma component.

Prediction is performed according to the reconstructed value of the second chroma component, the neighbouring reference value of the second chroma component, and the neighbouring reference value of the luma component to obtain a second prediction value of the luma component.

The prediction value of the luma component is determined according to the first prediction value and the second prediction value.

The current block is a block currently to be coded. Here, for the current block, the reconstructed value of the first chroma component of the current block, the reconstructed value of the second chroma component of the current block, the first chroma component of a neighbouring block of the current block, i.e., the neighbouring reference value of the first chroma component, the second chroma component of the neighbouring block of the current block, i.e., the neighbouring reference value of the second chroma component, and the luma component of the neighbouring block of the current block, i.e., the neighbouring reference value of the luma component are needed to be acquired. It is to be noted that the neighbouring blocks of the current block are blocks in the top-row of the current block and blocks in the left-column of the current block.

After the above values are acquired, the first prediction value may be predicted according to the reconstructed value of the first chroma component, the neighbouring reference value of the first chroma block, and the neighbouring reference value of the luma component, the second prediction value may be predicted according to the reconstructed value of the second chroma component, the neighbouring reference value of the second chroma component, and the neighbouring reference value of the luma component, and then the prediction value of the luma component of the current block is obtained according to the first prediction value and the second prediction value. As such, one prediction value is predicted through one chroma component, and the two prediction values obtained by prediction are finally fused to obtain the prediction value of the luma component of the current block.

For obtaining the first prediction value, in an optional embodiment, the operation that prediction is performed according to the reconstructed value of the first chroma component, the neighbouring reference value of the first chroma component, and the neighbouring reference value of the luma component to obtain the first prediction value of the luma component includes the following operations.

Parameters of a prediction model are determined according to the neighbouring reference value of the first chroma component and the neighbouring reference value of the luma component.

The prediction model is used according to the reconstructed value of the first chroma component to obtain the first prediction value.

After the reconstructed value of the first chroma component and the neighbouring reference value of the first chroma component are obtained, the colour component prediction model, which may be a linear model or a nonlinear model, is used to predict the luma component to obtain the first prediction value. Here, no specific limits are made in the embodiments of the application.

Specifically, for the linear model, a CCLM mode is used for a coder using the next-generation video coding standard, such as an H.266/VVC Joint Exploration Model (JEM) or a VVC Test Model (VTM). For example, the prediction value of the luma component is constructed according to formula (1) using a reconstructed chroma value of the same coding block:

$$\text{Pred}_L[i,j] = \alpha \cdot \text{Rec}_C[i,j] + \beta \quad (1).$$

i, j represents a position coordinate of a sample in the current block, i representing a horizontal direction, and j representing a vertical direction. $\text{Pred}_L[i, j]$ represents a prediction value of the luma component of the sample corresponding to the position coordinate i, j in the current block. $\text{Rec}_C[i, j]$ represents a reconstructed value of the chroma component of the sample corresponding to the position coordinate i, j in the current block. $\alpha$ and $\beta$ are scale factors of the linear model, and may be inferred by minimizing a regression error of the neighbouring reference value of the chroma component and the neighbouring reference value of the luma component, as shown in following formula (2):

$$\begin{cases} \alpha = \dfrac{N \cdot \sum (L(n) \cdot C(n)) - \sum L(n) \cdot \sum C(n)}{N \cdot \sum (L(n) \cdot L(n)) - \sum L(n) \cdot \sum L(n)} \\ \beta = \dfrac{\sum C(n) - \alpha \cdot \sum L(n)}{N} \end{cases} \quad (2)$$

L(n) represents the neighbouring (such as the left and the top) reference value of the luma component. C(n) represents the neighbouring (such as the left and the top) reference value of the chroma component. N is the number of neighbouring reference values of the luma component. $\alpha$ and $\beta$ are also calculated through formula (2) in the decoder.

$\alpha$ and $\beta$ may be calculated according to formula (2) by using the neighbouring reference value L(n) of the luma component of the current block and the neighbouring reference value C(n) of the chroma component. Then, the reconstructed value of the chroma component of the current block is substituted into the linear model as described in formula (2) to calculate the prediction value of the luma component of the current block.

In practical applications, the neighbouring reference values of the first chroma component and the neighbouring reference values of the luma component are substituted into formula (2) to obtain $\alpha$ and $\beta$, and then the reconstructed value of the first chroma component is substituted into formula (1) to obtain the first prediction value. As such, the first prediction value may be obtained by using the linear model.

Besides the linear model, the prediction model may also use the nonlinear model. Based on the linear model, the colour component prediction model further proposes a nonlinear model calculation method.

Specifically, when the parameters of the linear model are calculated, not only the neighbouring reference values of the chroma component and the neighbouring reference values of the luma component but also a correlation and similarity between the reconstructed value of the chroma component of the current block and the neighbouring reference values of the chroma component are considered, to obtain $\alpha$ and $\beta$ in the existing linear model, so that the obtained linear model fits the current reconstructed value of the chroma component better. Furthermore, the prediction value of the luma component of the current block is obtained.

For example, in the nonlinear model, neighbouring reference values of the chroma component of the current block and neighbouring reference values of the luma component are divided into two groups, and each group may be considered independently as a training set for inferring the parameters of the linear model, namely each group may be used to infer a group of parameters. Therefore, the defect that the linear model is deviated from an expected model when a deviation between the neighbouring reference values of the chroma component and the corresponding parameters of the current block is relatively great or a deviation between the neighbouring references value of the other chroma component and the corresponding parameters of the current block is relatively great may still be overcome, and furthermore, the prediction accuracy of the prediction value of the luma component may be greatly improved when the luma component of the current block is predicted according to the linear model.

For the nonlinear model, a threshold may be set to divide the neighbouring reference values and the reconstructed values into two groups, and the nonlinear model is established according to the two groups of neighbouring reference values and reconstructed values.

The threshold is a classification basis for the neighbouring reference values of the chroma component of the current block and the neighbouring reference values of the luma component, and is also a classification basis for the reconstructed values of the chroma component of the current block. The threshold is a set value configured to instruct establishment of multiple calculation models. A magnitude of the threshold is related to reconstructed values of the chroma component of all samples in the current block. Specifically, the threshold may be obtained by calculating an average of the reconstructed values of the chroma component of all the samples in the current block, or may be obtained by calculating a mid-value of the reconstructed values of the chroma component of all the samples in the current block. No specific limits are made thereto in the embodiments of the application.

In the embodiments of the application, the average Mean may be calculated at first according to the reconstructed values of the chroma component of all the samples in the current block and formula (3):

$$\text{Mean} = \frac{\sum Rec_C[i,j]}{M}. \quad (3)$$

Mean represents the average of the reconstructed values of the chroma component of all the samples in the current block. $\Sigma Rec_C[i,j]$ represents a sum of the reconstructed values of the chroma component of all the samples in the current block. M represents the number of samples of the reconstructed values of the chroma component of all the samples in the current block.

The calculated average Mean is directly determined as the threshold, and two calculation models may be established by using the threshold. However, the embodiments of the application are not limited to establishment of only two calculation models. For example, an average is calculated according to the sum $\Sigma Rec_C[i,j]$ of the reconstructed values of the chroma component of all the sample points in the current block to further obtain the average Mean. If two calculation models are established, Mean may be directly determined as the threshold, and the neighbouring reference values of the chroma component of the current block may be partitioned into two parts according to the threshold, which indicates that two calculation models may subsequently be established. If three calculation models are established, (minimum reconstructed value of the chroma component+Mean+1)>>1 is determined as a first threshold, (maximum reconstructed value of the chroma component+Mean+1)>>1 is determined as a second threshold, and the neighbouring reference values of the chroma component of the current block may be partitioned into three parts according to the two thresholds, which indicates that three calculation models may subsequently be established. Descriptions will be made below taking determining the calculated average Mean as the threshold for establishment of two calculation models as an example.

In some embodiments, if neighbouring reference values of the chroma component of the current block are not greater than at least one threshold, a first group of neighbouring reference values C(m) of the chroma component and neighbouring reference values L(m) of the luma component are obtained.

If neighbouring reference values of the chroma component of the current block are greater than at least one threshold, a second group of neighbouring reference values C(k) of the chroma component and neighbouring reference values L(k) of the luma component are obtained.

It is to be noted that, when the calculated average Mean is determined as the threshold, the neighbouring reference values of the chroma component of the current block may be partitioned into two parts, i.e., C(m) and C(k) respectively, and correspondingly, the neighbouring reference values of the luma component of the current block may also be partitioned into two parts, i.e., L(m) and L(k) respectively.

It can be understood that, after the first group of neighbouring reference values C(m) of the chroma component and neighbouring reference values L(m) of the luma component and the second group of neighbouring reference values C(k) of the chroma component and neighbouring reference values L(k) of the luma component are obtained, each group of neighbouring reference values of the chroma component and neighbouring reference values of the luma component may be used as an independent training set, namely each group may be used to train a group of model parameters. Therefore, in the abovementioned implementation mode, at least two calculation models are established according to at least two groups of neighbouring reference values of the chroma component and neighbouring reference values of the luma component, specifically including the following operations.

A first parameter $\alpha 1$ of a first calculation model and a second parameter $\beta 1$ of the first calculation model are calculated according to L(m), C(m), and formula (4):

$$\begin{cases} \alpha 1 = \dfrac{M \cdot \sum (L(m) \cdot C(m)) - \sum L(m) \cdot \sum C(m)}{M \cdot \sum (L(m) \cdot L(m)) - \sum L(m) \cdot \sum L(m)} \\ \beta 1 = \dfrac{\sum C(m) - \alpha 1 \cdot \sum L(m)}{M} \end{cases} \quad (4)$$

A first parameter $\alpha 2$ of a second calculation model and a second parameter $\beta 2$ of the second calculation model are calculated according to L(k), C(k), and formula (5):

$$\begin{cases} \alpha 2 = \dfrac{K \cdot \sum (L(k) \cdot C(k)) - \sum L(k) \cdot \sum C(k)}{K \cdot \sum (L(k) \cdot L(k)) - \sum L(k) \cdot \sum L(k)} \\ \beta 2 = \dfrac{\sum C(k) - \alpha 2 \cdot \sum L(k)}{K} \end{cases} \quad (5)$$

The first calculation model $Pred_{1L}[i,j]$ and the second calculation model $Pred_{2L}[i,j]$ are established according to the first parameter $\alpha 1$ of the first calculation model, the second parameter $\beta 1$ of the first calculation model, the first parameter $\alpha 2$ of the second calculation model, the second parameter $\beta 2$ of the second calculation model, and formula (6):

$$\begin{cases} Pred_{1L}[i,j] = \alpha 1 \times Rec_C[i,j] + \beta 1, & \text{if } Rec_C[i,j] \leq \text{Threshold} \\ Pred_{2L}[i,j] = \alpha 2 \times Rec_C[i,j] + \beta 2, & \text{if } Rec_C[i,j] > \text{Threshold} \end{cases} \quad (6)$$

M represents the number of the neighbouring reference values C(m) of the chroma component in the first group or the number of the neighbouring reference values L(m) of the luma component in the first group. K represents the number of the neighbouring reference values C(k) of the chroma component in the second group or the number of the neighbouring reference values L(k) of the luma component in the second group. [i, j] represents the position coordinate of a sample in the current block, i representing the horizontal direction, and j representing the vertical direction. Threshold represents a preset threshold, and the preset threshold is obtained according to the reconstructed values of the chroma component of all the samples in the current block. $Rec_C[i,j]$ represents the reconstructed value of the chroma component of the sample corresponding to the position coordinate [i, j] in the current block. $\text{Pred}_{1L}[i, j]$ and $\text{Pred}_{2L}[i, j]$ represent prediction values of the luma component of the sample corresponding to the position coordinate [i, j] in the current block.

In practical applications, the threshold is calculated at first according to the reconstructed values of the first chroma component, and the neighbouring reference values of the first chroma component and the neighbouring reference values of the luma component are classified according to the threshold. Taking two calculation models as an example, $\alpha 1$ and $\beta 1$ are obtained according to formula (4), and $\alpha 2$ and $\beta 2$ are obtained according to formula (5). Then, the reconstructed value of the first chroma component may be substituted into formula (6) to obtain the first prediction value.

For obtaining the second prediction value, in an optional embodiment, the operation that prediction is performed according to the reconstructed value of the second chroma component, the neighbouring reference value of the second chroma component, and the neighbouring reference value of the luma component to obtain the second prediction value of the luma component includes the following operations.

The parameters of the prediction model are determined according to the neighbouring reference values of the second chroma component and the neighbouring reference values of the luma component.

The prediction model is used according to the reconstructed value of the second chroma component to obtain the second prediction value.

Similarly, like the manner for calculating the first prediction value, for the linear model, in practical applications, the neighbouring reference values of the second chroma component and the neighbouring reference values of the luma component are substituted into formula (2) to obtain $\alpha$ and $\beta$, and then the reconstructed value of the second chroma component is substituted into formula (1) to obtain the second prediction value. As such, the second prediction value may be obtained by using the linear model.

For the nonlinear model, in practical applications, the threshold is calculated at first according to the reconstructed values of the second chroma component, and the neighbouring reference values of the second chroma component and the neighbouring reference values of the luma component are classified according to the threshold. Taking two calculation models as an example, $\alpha 1$ and $\beta 1$ are obtained according to formula (4), and $\alpha 2$ and $\beta 2$ are obtained according to formula (5). Then, the reconstructed value of the second chroma component may be substituted into formula (6) to obtain the second prediction value.

As such, the first prediction value and the second prediction value may be obtained.

For determining the prediction value of the luma component, in an optional embodiment, the operation that the prediction value of the luma component is determined according to the first prediction value and the second prediction value includes the following operations.

A weight value of the first prediction value and a weight value of the second prediction value are acquired.

Weighted sum is performed on the first prediction value and the second prediction value according to the weight value of the first prediction value and the weight value of the second prediction value to obtain the prediction value of the luma component.

After the first prediction value and the second prediction value are determined, fusion processing may be performed on the first prediction value and the second prediction value, and a value obtained by fusion processing is determined as the prediction value of the luma component.

Specifically, the weight value of the first prediction value and the weight value of the second prediction value may be acquired at first, and then weighted sum is performed on the first prediction value and the second prediction value in a weighted sum manner to obtain the prediction value of the luma component.

There are many manners for acquiring the weight value of the first prediction value and the weight value of the second prediction value. In an optional embodiment, the operation that the weight value of the first prediction value and the weight value of the second prediction value are acquired may include the following operation.

A group of weight values are selected from preset weight value groups, one value in the group of weight values is determined as the weight value of the first prediction value, and the other value in the group of weight values is determined as the weight value of the second prediction value.

That is, multiple groups of weight values are preset in the encoder, such as (0.5, 0.5), (0.2, 0.8), (0.3, 0.7), and (0.1, 0.9), etc, and one group may be selected from the preset weight value groups. If (0.5, 0.5) is selected, the weight value of the first prediction value is 0.5, and the weight value of the second prediction value is 0.5. As such, the weight value of the first prediction value and the weight value of the second prediction value may be determined.

In such case, at the decoder side, a selected result may be identified by a corresponding syntactic element in a bitstream such that the decoder may predict the prediction value of the luma component conveniently.

In an optional embodiment, the operation that the weight value of the first prediction value and the weight value of the second prediction value are acquired may include the following operations.

A first weight value and a second weight value are received.

The first weight value is determined as the weight value of the first prediction value, and the second weight value is determined as the weight value of the second prediction value.

Here, the weight value of the first prediction value and the weight value of the second prediction value may be determined in advance by inputting by a user. In such case, the encode receives the first weight value and the second weight value, and may determine the first weight value as the weight value of the first prediction value and determine the second weight value as the weight value of the second prediction value. Meanwhile, the selected result is identified by the corresponding syntactic element in the bitstream such that the decoder may receive the weight values and predict the prediction value of the luma component conveniently.

In addition, in practical applications, a resolution of the chroma component of the current block is less than a resolution of the luma component. Up-sampling may be selected to be performed on the reconstructed value of the first chroma component and the reconstructed value of the second chroma component, or up-sampling may be selected to be performed on the first prediction value and the second prediction value, or up-sampling processing may be selected to be performed on the prediction value of the luma component after the prediction value of the luma component is obtained. Here, no specific limits are made thereto in the embodiments of the application.

When up-sampling is performed on the reconstructed value of the first chroma component and the reconstructed value of the second chroma component, in an optional embodiment, after for the current block, the operation that the reconstructed value of the first chroma component, the reconstructed value of the second chroma component, the neighbouring reference value of the first chroma component, the neighbouring reference value of the second chroma component, and the neighbouring reference value of the luma component are acquired, the method further includes the following operation.

When a resolution of the chroma component is less than a resolution of the luma component, up-sampling processing is performed on the reconstructed value of the first chroma component and the reconstructed value of the second chroma component respectively to obtain a processed reconstructed value of the first chroma component and a processed reconstructed value of the second chroma component.

Correspondingly, the operation that prediction is performed according to the reconstructed value of the first chroma component, the neighbouring reference value of the first chroma component, and the neighbouring reference value of the luma component to obtain the first prediction value of the luma component includes the following operation.

Prediction is performed according to the processed reconstructed value of the first chroma component, the neighbouring reference value of the first chroma component, and the neighbouring reference value of the luma component to obtain the first prediction value of the luma component.

Correspondingly, the operation that prediction is performed according to the reconstructed value of the second chroma component, the neighbouring reference value of the second chroma component, and the neighbouring reference value of the luma component to obtain the second prediction value of the luma component includes the following operation.

Prediction is performed according to the processed reconstructed value of the second chroma component, the neighbouring reference value of the second chroma component, and the neighbouring reference value of the luma component to obtain the second prediction value of the luma component.

Specifically, since the resolution of the chroma component of the current block is less than the resolution of the luma component, for improving the prediction accuracy, here, after the reconstructed value of the first chroma component and the reconstructed value of the second chroma component are acquired, up-sampling is needed to be performed on the reconstructed value of the first chroma component and the reconstructed value of the second chroma component to make a resolution of the processed reconstructed value of the first chroma component and a resolution of the processed reconstructed value of the second chroma component the same as the resolution of the luma component respectively, to improve the prediction accuracy.

In such case, after the processed reconstructed value of the first chroma component and the processed reconstructed value of the second chroma component are acquired, prediction may be performed according to the processed reconstructed value of the first chroma component, the neighbouring reference value of the first chroma component, and the neighbouring reference value of the luma component to obtain the first prediction value of the luma component, and prediction may be performed according to the processed reconstructed value of the second chroma component, the neighbouring reference value of the second chroma component, and the neighbouring reference value of the luma component to obtain the second prediction value of the luma component. The prediction value of the luma component of the current block is determined according to the obtained first prediction value and second prediction value.

Here, when up-sampling is performed on the first prediction value and the second prediction value, in an optional embodiment, before the operation that the prediction value of the luma component is determined according to the first prediction value and the second prediction value, the method further includes the following operation.

When the resolution of the chroma component is less than the resolution of the luma component, up-sampling processing is performed on the first prediction value and the second prediction value respectively to obtain a processed first prediction value and a processed second prediction value.

Correspondingly, the operation that the prediction value of the luma component is determined according to the first prediction value and the second prediction value includes the following operation.

The prediction value of the luma component is determined according to the processed first prediction value and the processed second prediction value.

Here, when the resolution of the chroma component is less than the resolution of the luma component, for adapting to the resolution of the luma component, after the first prediction value and the second prediction value are obtained, up-sampling is performed on the first prediction value and the second prediction value respectively to obtain the processed first prediction value and the processed second prediction value. The prediction value of the luma component is finally determined according to the processed first prediction value and the processed second prediction value.

When up-sampling is performed on the prediction value of the luma component, in an optional embodiment, after the operation that the prediction value of the luma component is determined according to the first prediction value and the second prediction value, the method further includes the following operation.

When the resolution of the chroma component is less than the resolution of the luma component, up-sampling processing is performed on the prediction value of the luma component to obtain a processed prediction value of the luma component.

That is, up-sampling is determined to be performed on the prediction value of the luma component after the prediction value of the luma component is obtained, so that a resolution of the processed prediction value of the luma component is the same as the resolution of the luma component.

Figure 4:
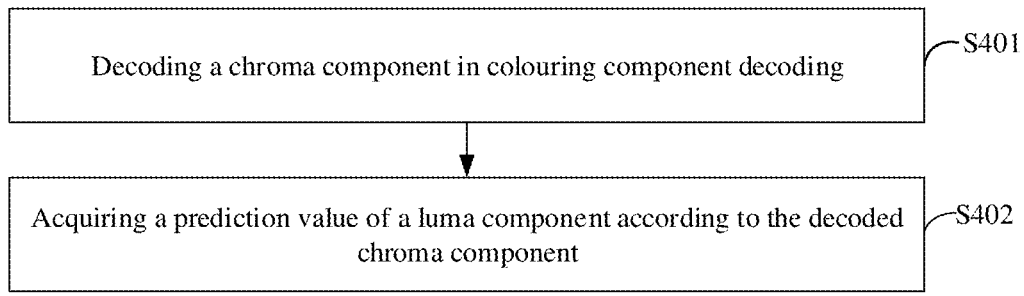
FIG. 4 is another optional schematic flowchart of a method for predicting colour components according to some embodiments of the application.

The embodiments of the application provide a method for predicting colour component. FIG. 4 is an optional schematic flowchart of a method for predicting colour component according to embodiments of the application. As shown in FIG. 4, the method may include the following operations.

In S401, chroma components are decoded in colour component decoding.

In S402, a prediction value of a luma component is acquired according to the decoded chroma components.

It is to be noted that S401 and S402 in the embodiments of the application are mainly applied to the intra prediction unit 203 shown in FIG. 2 and the intra prediction unit 303 shown in FIG. 3. That is, the embodiments of the application may be applied to an encoder and a decoder at the same time. However, no specific limits are made thereto in the embodiments of the application.

In addition, in S401 and S402, in colour component decoding, one chroma component is decoded, and then the luma component is predicted using the chroma component. Alternatively, one chroma component is decoded and then another chroma component is predicted using the chroma component, or the two chroma components are decoded at first, and then the luma component is predicted using one chroma component, or the luma component is predicted using the two chroma components. Here, no specific limits are made thereto in the embodiments of the application.

For obtaining the prediction value of the luma component, in an optional embodiment, S402 may include the following operation.

Prediction is performed according to a first chroma component in the decoded chroma components and a second chroma component in the decoded chroma components to obtain the prediction value of the luma component.

When the first chroma component is a blue chroma component, the second chroma component is a red chroma component. When the first chroma component is the red chroma component, the second chroma component is the blue chroma component.

Here, the prediction value of the luma component is predicted using the first chroma component in the decoded chroma components and the second chroma component in the decoded chroma components. For example, if the first chroma component is Cb, the second chroma component is Cr, and the luma component is Y, Y may be predicted through Cb and Cr. Alternatively, if the first chroma component is Cr, the second chroma component is Cb, and the luma component is Y, Y may be predicted through Cb and Cr.

Furthermore, for predicting the prediction value of the luma component, in an optional embodiment, the operation that prediction is performed according to the first chroma component in the decoded chroma components and the second chroma component in the decoded chroma components to obtain the prediction value of the luma component includes the following operations.

For a current block, a reconstructed value of the first chroma component, a reconstructed value of the second chroma component, a neighbouring reference value of the first chroma component, a neighbouring reference value of the second chroma component, and a neighbouring reference value of the luma component are acquired.

Prediction is performed according to the reconstructed value of the first chroma component, the neighbouring reference value of the first chroma component, and the neighbouring reference value of the luma component to obtain a first prediction value of the luma component.

Prediction is performed according to the reconstructed value of the second chroma component, the neighbouring reference value of the second chroma component, and the neighbouring reference value of the luma component to obtain a second prediction value of the luma component.

The prediction value of the luma component is determined according to the first prediction value and the second prediction value.

The current block is an block currently to be decoded. Here, for the current block, the reconstructed value of the first chroma component of the current block, the reconstructed value of the second chroma component of the current block, the first chroma component of a neighbouring block of the current block, i.e., the neighbouring reference value of the first chroma component, the second chroma component of the neighbouring block of the current block, i.e., the neighbouring reference value of the second chroma component, and the luma component of the neighbouring block of the current block, i.e., the neighbouring reference value of the luma component are required to be acquired. It is to be noted that the neighbouring blocks of the current block are blocks in the top-row of the current block and blocks in the left-column of the current block.

After the above values are acquired, the first prediction value may be predicted according to the reconstructed value of the first chroma component, the neighbouring reference value of the first chroma block, and the neighbouring reference value of the luma component, the second prediction value may be predicted according to the reconstructed value of the second chroma component, the neighbouring reference value of the second chroma component, and the neighbouring reference value of the luma component, and then the prediction value of the luma component of the current block is obtained according to the first prediction value and the second prediction value. As such, one prediction value is predicted through one chroma component respectively, and the two prediction values obtained by prediction are finally fused to obtain the prediction value of the luma component of the current block.

For obtaining the first prediction value, in an optional embodiment, the operation that prediction is performed according to the reconstructed value of the first chroma component, the neighbouring reference value of the first chroma component, and the neighbouring reference value of the luma component to obtain the first prediction value of the luma component includes the following operations.

Parameters of a prediction model are determined according to the neighbouring reference value of the first chroma component and the neighbouring reference value of the luma component.

The prediction model is used according to the reconstructed value of the first chroma component to obtain the first prediction value.

After the reconstructed value of the first chroma component and the neighbouring reference value of the first chroma component are obtained, the colour component prediction model which may be a linear model or a nonlinear model is used to predict the luma component to obtain the first prediction value. Here, no specific limits are made in the embodiments of the application.

In practical applications, the neighbouring reference value of the first chroma component and the neighbouring reference value of the luma component are substituted into formula (2) to obtain $\alpha$ and $\beta$, and then the reconstructed value of the first chroma component is substituted into formula (1) to obtain the first prediction value. As such, the first prediction value may be obtained using the linear model.

Besides the linear model, the prediction model may also use the nonlinear model. Based on the linear model, the colour component prediction model further proposes a nonlinear model calculation method.

In practical applications, a threshold is calculated at first according to the reconstructed values of the first chroma component, and the neighbouring reference values of the first chroma component and the neighbouring reference values of the luma component are classified according to the threshold. Taking two calculation models as an example, $\alpha 1$ and $\beta 1$ are obtained according to formula (4), and $\alpha 2$ and $\beta 2$ are obtained according to formula (5). Then, the reconstructed value of the first chroma component may be substituted into formula (6) to obtain the first prediction value.

For obtaining the second prediction value, in an optional embodiment, the operation that prediction is performed according to the reconstructed value of the second chroma component, the neighbouring reference value of the second chroma component, and the neighbouring reference value of the luma component to obtain the second prediction value of the luma component includes the following operations.

The parameters of the prediction model are determined according to the neighbouring reference values of the second chroma component and the neighbouring reference values of the luma component.

The prediction model is used according to the reconstructed value of the second chroma component to obtain the second prediction value.

Similarly, like the manner for calculating the first prediction value, for the linear model, in practical applications, the neighbouring reference values of the second chroma component and the neighbouring reference values of the luma component are substituted into formula (2) to obtain $\alpha$ and $\beta$, and then the reconstructed value of the second chroma component is substituted into formula (1) to obtain the second prediction value. As such, the second prediction value may be obtained by using the linear model.

For the nonlinear model, in practical applications, the threshold is calculated at first according to the reconstructed values of the second chroma component, and the neighbouring reference values of the second chroma component and the neighbouring reference values of the luma component are classified according to the threshold. Taking two calculation models as an example, $\alpha 1$ and $\beta 1$ are obtained according to formula (4), and $\alpha 2$ and $\beta 2$ are obtained according to formula (5). Then, the reconstructed value of the second chroma component may be substituted into formula (6) to obtain the second prediction value.

As such, the first prediction value and the second prediction value may be obtained.

For determining the prediction value of the luma component, in an optional embodiment, the operation that the prediction value of the luma component is determined according to the first prediction value and the second prediction value includes the following operations.

A weight value of the first prediction value and a weight value of the second prediction value are acquired.

Weighted sum is performed on the first prediction value and the second prediction value according to the weight value of the first prediction value and the weight value of the second prediction value to obtain the prediction value of the luma component.

After the first prediction value and the second prediction value are determined, fusion processing may be performed on the first prediction value and the second prediction value, and a value obtained by fusion processing is determined as the prediction value of the luma component.

Specifically, the weight value of the first prediction value and the weight value of the second prediction value may be acquired at first, and then weighted sum is performed on the first prediction value and the second prediction value in a weighted sum manner to obtain the prediction value of the luma component.

There are many manners for acquiring the weight value of the first prediction value and the weight value of the second prediction value. In an optional embodiment, the operation that the weight value of the first prediction value and the weight value of the second prediction value are acquired may include the following operation.

A group of weight values are selected from preset weight value groups, one value in the group of weight values is determined as the weight value of the first prediction value, and the other value in the group of weight values is determined as the weight value of the second prediction value.

That is, multiple groups of weight values are preset in the decoder, such as (0.5, 0.5), (0.2, 0.8), (0.3, 0.7), and (0.1, 0.9), etc, and one group may be selected from the preset weight value groups. If (0.5, 0.5) is selected, the weight value of the first prediction value is 0.5, and the weight value of the second prediction value is 0.5. As such, the weight value of the first prediction value and the weight value of the second prediction value may be determined.

In such case, at the decoder side, a selected result may be identified by a corresponding syntactic element in a bitstream such that the decoder may predict the prediction value of the luma component conveniently.

In an optional embodiment, the operation that the weight value of the first prediction value and the weight value of the second prediction value are acquired may include the following operations.

A first weight value and a second weight value are received.

The first weight value is determined as the weight value of the first prediction value, and the second weight value is determined as the weight value of the second prediction value.

Here, the weight value of the first prediction value and the weight value of the second prediction value may be determined in advance by inputting by a user. In such case, the encoder receives the first weight value and the second weight value, may determine the first weight value as the weight value of the first prediction value and determine the second weight value as the weight value of the second prediction value. Meanwhile, the selected result is identified by the corresponding syntactic element in the bitstream such that the decoder may receive the weight values and predict the prediction value of the luma component conveniently.

In addition, in practical applications, a resolution of the chroma component of the current block is less than a resolution of the luma component. Up-sampling may be selected to be performed on the reconstructed value of the first chroma component and the reconstructed value of the second chroma component, or up-sampling may be selected to be performed on the first prediction value and the second prediction value, or up-sampling processing may be selected to be performed on the prediction value of the luma component after the prediction value of the luma component is obtained. Here, no specific limits are made thereto in the embodiments of the application.

When up-sampling is performed on the reconstructed value of the first chroma component and the reconstructed value of the second chroma component, in an optional embodiment, after the operation that, for the current block, the reconstructed value of the first chroma component, the reconstructed value of the second chroma component, the neighbouring reference value of the first chroma component, the neighbouring reference value of the second chroma component, and the neighbouring reference value of the luma component are acquired, the method further includes the following operation.

When a resolution of the chroma component is less than a resolution of the luma component, up-sampling processing is performed on the reconstructed value of the first chroma component and the reconstructed value of the second chroma component respectively to obtain a processed reconstructed value of the first chroma component and a processed reconstructed value of the second chroma component.

Correspondingly, the operation that prediction is performed according to the reconstructed value of the first chroma component, the neighbouring reference value of the first chroma component, and the neighbouring reference value of the luma component to obtain the first prediction value of the luma component includes the following operation.

Prediction is performed according to the processed reconstructed value of the first chroma component, the neighbouring reference value of the first chroma component, and the neighbouring reference value of the luma component to obtain the first prediction value of the luma component.

Correspondingly, the operation that prediction is performed according to the reconstructed value of the second chroma component, the neighbouring reference value of the second chroma component, and the neighbouring reference value of the luma component to obtain the second prediction value of the luma component includes the following operation.

Prediction is performed according to the processed reconstructed value of the second chroma component, the neighbouring reference value of the second chroma component, and the neighbouring reference value of the luma component to obtain the second prediction value of the luma component.

Specifically, since the resolution of the chroma component of the current block is less than the resolution of the luma component, for improving the prediction accuracy, here, after the reconstructed value of the first chroma component and the reconstructed value of the second chroma component are acquired, up-sampling is needed to be performed on the reconstructed value of the first chroma component and the reconstructed value of the second chroma component to make a resolution of the processed reconstructed value of the first chroma component and a resolution of the processed reconstructed value of the second chroma component the same as the resolution of the luma component respectively, to improve the prediction accuracy.

In such case, after the processed reconstructed value of the first chroma component and the processed reconstructed value of the second chroma component are acquired, prediction may be performed according to the processed reconstructed value of the first chroma component, the neighbouring reference value of the first chroma component, and the neighbouring reference value of the luma component to obtain the first prediction value of the luma component, and prediction may be performed according to the processed reconstructed value of the second chroma component, the neighbouring reference value of the second chroma component, and the neighbouring reference value of the luma component to obtain the second prediction value of the luma component. The prediction value of the luma component of the current block is determined according to the obtained first prediction value and second prediction value.

Here, when up-sampling is performed on the first prediction value and the second prediction value, in an optional embodiment, before the operation that the prediction value of the luma component is determined according to the first prediction value and the second prediction value, the method further includes the following operation.

When the resolution of the chroma component is less than the resolution of the luma component, up-sampling processing is performed on the first prediction value and the second prediction value respectively to obtain a processed first prediction value and a processed second prediction value.

Correspondingly, the operation that the prediction value of the luma component is determined according to the first prediction value and the second prediction value includes the following operation.

The prediction value of the luma component is determined according to the processed first prediction value and the processed second prediction value.

Here, when the resolution of the chroma component is less than the resolution of the luma component, for adapting to the resolution of the luma component, after the first prediction value and the second prediction value are obtained, up-sampling is performed on the first prediction value and the second prediction value respectively to obtain the processed first prediction value and the processed second prediction value. The prediction value of the luma component is finally determined according to the processed first prediction value and the processed second prediction value.

When up-sampling is performed on the prediction value of the luma component, in an optional embodiment, after the operation that the prediction value of the luma component is determined according to the first prediction value and the second prediction value, the method further includes the following operation.

When the resolution of the chroma component is less than the resolution of the luma component, up-sampling processing is performed on the prediction value of the luma component to obtain a processed prediction value of the luma component.

That is, up-sampling is determined to be performed on the prediction value of the luma component after the prediction value of the luma component is obtained, so that a resolution of the processed prediction value of the luma component is the same as the resolution of the luma component.

The embodiments of the application provide the method for predicting colour component. The method includes that: the chroma components are coded in colour component coding, and the prediction value of the luma component is acquired according to the coded chroma components. That is, in the embodiments of the application, the chroma components are encoded/decoded at first, and then the luma component is predicted through the encoded/decoded chroma components. In this manner, the luma component is predicted through the encoded/decoded chroma components, namely the relatively flat chroma components are encoded/decoded at first, and then the luma component having rich texture is predicted based on the encoded/decoded chroma components, so that the prediction accuracy of the luma component may be improved, and the prediction value of the luma component is more approximate to a real pixel value of the luma component.

Embodiment 2

Figure 5:
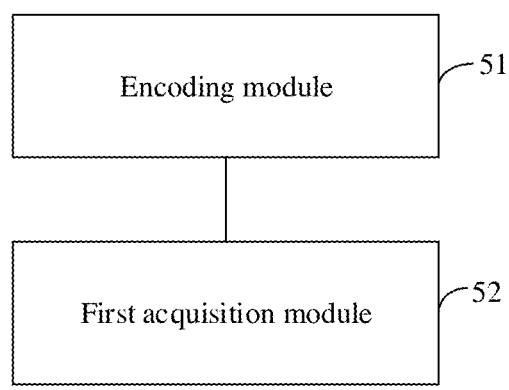
FIG. 5 is an optional structure diagram of an encoder according to some embodiments of the application.

Based on the same inventive concept, FIG. 5 is an optional structure diagram of an encoder according to embodiments of the application. As shown in FIG. 5, the encoder disclosed in the embodiments of the application may include an encoding module 51 and a first acquisition module 52.

The encoding module 51 is configured to encode chroma components in a colour component encoding process.

The first acquisition module 52 is configured to acquire a prediction value of a luma component according to the encoded chroma components.

Furthermore, the first acquisition module 52 is specifically configured perform prediction according to a first chroma component in the encoded chroma components and a second chroma component in the encoded chroma components to obtain the prediction value of the luma component.

When the first chroma component is a blue chroma component, the second chroma component is a red chroma component. When the first chroma component is the red chroma component, the second chroma component is the blue chroma component.

Furthermore, the operation that the first acquisition module 52 performs prediction according to the first chroma component in the encoded chroma components and the second chroma component in the encoded chroma components to obtain the prediction value of the luma component includes the following operations.

For a current block, a reconstructed value of the first chroma component, a reconstructed value of the second chroma component, a neighbouring reference value of the first chroma component, a neighbouring reference value of the second chroma component, and a neighbouring reference value of the luma component are required.

Prediction is performed according to the reconstructed value of the first chroma component, the neighbouring reference value of the first chroma component, and the neighbouring reference value of the luma component to obtain a first prediction value of the luma component.

Prediction is performed according to the reconstructed value of the second chroma component, the neighbouring reference value of the second chroma component, and the neighbouring reference value of the luma component to obtain a second prediction value of the luma component.

The prediction value of the luma component is determined according to the first prediction value and the second prediction value.

Furthermore, the operation that the first acquisition module 52 performs prediction according to the reconstructed value of the first chroma component, the neighbouring reference value of the first chroma component, and the neighbouring reference value of the luma component to obtain the first prediction value of the luma component includes the following operations.

A parameter of a prediction model is determined according to the neighbouring reference value of the first chroma component and the neighbouring reference value of the luma component.

The prediction model is used according to the reconstructed value of the first chroma component to obtain the first prediction value.

Furthermore, the operation that the first acquisition module 52 performs prediction according to the reconstructed value of the second chroma component, the neighbouring reference value of the second chroma component, and the neighbouring reference value of the luma component to obtain the second prediction value of the luma component includes the following operations.

The parameter of the prediction model is determined according to the neighbouring reference value of the second chroma component and the neighbouring reference value of the luma component.

The prediction model is used according to the reconstructed value of the second chroma component to obtain the second prediction value.

Furthermore, the operation that the first acquisition module 52 determines the prediction value of the luma component according to the first prediction value and the second prediction value includes the following operations.

A weight value of the first prediction value and a weight value of the second prediction value are acquired.

Weighted sum is performed on the first prediction value and the second prediction value according to the weight value of the first prediction value and the weight value of the second prediction value to obtain the prediction value of the luma component.

Furthermore, the operation that the first acquisition module 52 acquires the weight value of the first prediction value and the weight value of the second prediction value includes the following operation.

A group of weight values is selected from preset weight value groups, determining one value in the group of weight values as the weight value of the first prediction value, and determining the other value in the group of weight values as the weight value of the second prediction value.

Furthermore, the first acquisition module 52 is specifically configured to: after acquiring the reconstructed value of the first chroma component, the reconstructed value of the second chroma component, the neighbouring reference value of the first chroma component, the neighbouring reference value of the second chroma component, and the neighbouring reference value of the luma component for the current block, when a resolution of the chroma component is less than a resolution of the luma component, perform up-sampling processing on the reconstructed value of the first chroma component and the reconstructed value of the second chroma component respectively to obtain a processed reconstructed value of the first chroma component and a processed reconstructed value of the second chroma component.

Correspondingly, the operation that the first acquisition module 52 performs prediction according to the reconstructed value of the first chroma component, the neighbouring reference value of the first chroma component, and the neighbouring reference value of the luma component to obtain the first prediction value of the luma component includes the following operation.

Prediction is performed according to the processed reconstructed value of the first chroma component, the neighbouring reference value of the first chroma component, and the neighbouring reference value of the luma component to obtain the first prediction value of the luma component.

Correspondingly, the operation that the first acquisition module 52 performs prediction according to the reconstructed value of the second chroma component, the neighbouring reference value of the second chroma component, and the neighbouring reference value of the luma component to obtain the second prediction value of the luma component includes the following operation.

Prediction is performed according to the processed reconstructed value of the second chroma component, the neighbouring reference value of the second chroma component, and the neighbouring reference value of the luma component to obtain the second prediction value of the luma component.

In an optional embodiment, the first acquisition module 52 is further specifically configured to: before determining the prediction value of the luma component according to the first prediction value and the second prediction value, when the resolution of the chroma component is less than the resolution of the luma component, perform up-sampling processing on the first prediction value and the second prediction value respectively to obtain a processed first prediction value and a processed second prediction value.

Correspondingly, the operation that the first acquisition module 52 determines the prediction value of the luma component according to the first prediction value and the second prediction value includes the following operation.

The prediction value of the luma component is determined according to the processed first prediction value and the processed second prediction value.

In an optional embodiment, the first acquisition module 52 is further specifically configured to: after determining the prediction value of the luma component according to the first prediction value and the second prediction value, when the resolution of the chroma component is less than the resolution of the luma component, perform up-sampling processing on the prediction value of the luma component to obtain a processed prediction value of the luma component.

Figure 6:
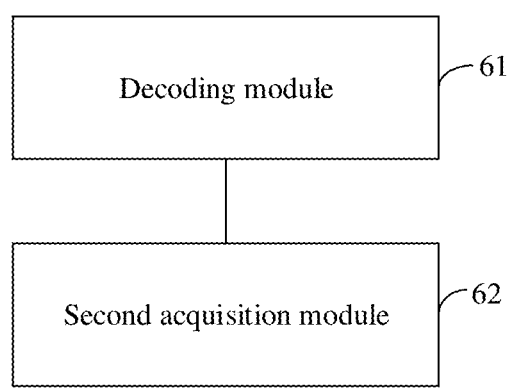
FIG. 6 is an optional structure diagram of a decoder according to some embodiments of the application.

Based on the same inventive concept, FIG. 6 is an optional structure diagram of a decoder according to embodiments of the application. As shown in FIG. 6, the decoder disclosed in the embodiments of the application may include a decoding module 61 and a second acquisition module 62.

The decoding module 61 is configured to decode chroma components in a colour component decoding process.

The second acquisition module 62 is configured to acquire a prediction value of a luma component according to the decoded chroma components.

Furthermore, the second acquisition module 62 is specifically configured to: perform prediction according to a first chroma component in the decoded chroma components and a second chroma component in the decoded chroma components to obtain the prediction value of the luma component.

When the first chroma component is a blue chroma component, the second chroma component is a red chroma component. When the first chroma component is the red chroma component, the second chroma component is the blue chroma component.

Furthermore, the operation that the second acquisition module 62 performs prediction according to the first chroma component in the decoded chroma components and the second chroma component in the decoded chroma components to obtain the prediction value of the luma component includes the following operations.

For a current block, a reconstructed value of the first chroma component, a reconstructed value of the second chroma component, a neighbouring reference value of the first chroma component, a neighbouring reference value of the second chroma component, and a neighbouring reference value of the luma component are acquired.

Prediction is performed according to the reconstructed value of the first chroma component, the neighbouring reference value of the first chroma component, and the neighbouring reference value of the luma component to obtain a first prediction value of the luma component.

Prediction is performed according to the reconstructed value of the second chroma component, the neighbouring reference value of the second chroma component, and the neighbouring reference value of the luma component to obtain a second prediction value of the luma component.

The prediction value of the luma component is determined according to the first prediction value and the second prediction value.

Furthermore, the operation that the second acquisition module 62 performs prediction according to the reconstructed value of the first chroma component, the neighbouring reference value of the first chroma component, and the neighbouring reference value of the luma component to obtain the first prediction value of the luma component includes the following operations.

A parameter of a prediction model is determined according to the neighbouring reference value of the first chroma component and the neighbouring reference value of the luma component.

The prediction model is used according to the reconstructed value of the first chroma component to obtain the first prediction value.

Furthermore, the operation that the second acquisition module 62 performs prediction according to the reconstructed value of the second chroma component, the neighbouring reference value of the second chroma component, and the neighbouring reference value of the luma component to obtain the second prediction value of the luma component includes the following operations.

The parameter of the prediction model is determined according to the neighbouring reference value of the second chroma component and the neighbouring reference value of the luma component.

The prediction model is used according to the reconstructed value of the second chroma component to obtain the second prediction value.

Furthermore, the operation that the second acquisition module 62 determines the prediction value of the luma component according to the first prediction value and the second prediction value includes the following operations.

A weight value of the first prediction value and a weight value of the second prediction value are acquired.

Weighted sum is performed on the first prediction value and the second prediction value according to the weight value of the first prediction value and the weight value of the second prediction value to obtain the prediction value of the luma component.

Furthermore, the operation that the second acquisition module 62 acquires the weight value of the first prediction value and the weight value of the second prediction value includes the following operation.

A group of weight values is selected from preset weight value groups, one value in the group of weight values is determined as the weight value of the first prediction value, and the other value in the group of weight values is determined as the weight value of the second prediction value.

Furthermore, the second acquisition module 62 is specifically configured to: after acquiring the reconstructed value of the first chroma component, the reconstructed value of the second chroma component, the neighbouring reference value of the first chroma component, the neighbouring reference value of the second chroma component, and the neighbouring reference value of the luma component for the current block, when a resolution of the chroma component is less than a resolution of the luma component, perform up-sampling processing on the reconstructed value of the first chroma component and the reconstructed value of the second chroma component respectively to obtain a processed reconstructed value of the first chroma component and a processed reconstructed value of the second chroma component.

Correspondingly, the operation that the second acquisition module 62 performs prediction according to the reconstructed value of the first chroma component, the neighbouring reference value of the first chroma component, and the neighbouring reference value of the luma component to obtain the first prediction value of the luma component includes the following operation.

Prediction is performed according to the processed reconstructed value of the first chroma component, the neighbouring reference value of the first chroma component, and the neighbouring reference value of the luma component to obtain the first prediction value of the luma component.

Correspondingly, the operation that the second acquisition module 62 performs prediction according to the reconstructed value of the second chroma component, the neighbouring reference value of the second chroma component, and the neighbouring reference value of the luma component to obtain the second prediction value of the luma component includes the following operation.

Prediction is performed according to the processed reconstructed value of the second chroma component, the neighbouring reference value of the second chroma component, and the neighbouring reference value of the luma component to obtain the second prediction value of the luma component.

In an optional embodiment, the second acquisition module 62 is further specifically configured to:
before determining the prediction value of the luma component according to the first prediction value and the second prediction value, when the resolution of the chroma component is less than the resolution of the luma component, perform up-sampling processing on the first prediction value and the second prediction value respectively to obtain a processed first prediction value and a processed second prediction value.

Correspondingly, the operation that the second acquisition module 62 determines the prediction value of the luma component according to the first prediction value and the second prediction value includes the following operation.

The prediction value of the luma component is determined according to the processed first prediction value and the processed second prediction value.

In an optional embodiment, the second acquisition module 62 is further specifically configured to:
after determining the prediction value of the luma component according to the first prediction value and the second prediction value, when the resolution of the chroma component is less than the resolution of the luma component, perform up-sampling processing on the prediction value of the luma component to obtain a processed prediction value of the luma component.

Figure 7:
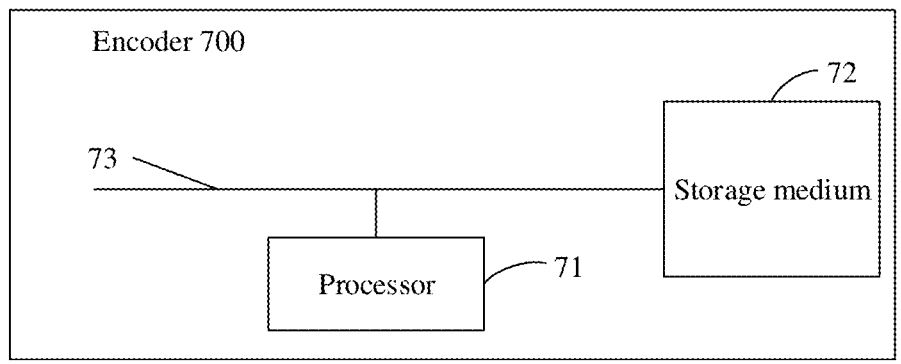
FIG. 7 is another optional structure diagram of an encoder according to some embodiments of the application.

FIG. 7 is another optional structure diagram of an encoder according to embodiments of the application. As shown in FIG. 7, the encoder 700 disclosed in the embodiments of the application may further include a processor 71 and a storage medium 72 storing instructions executable for the processor 71. The storage medium 72 executes operations dependently on the processor 71 through a communication bus 73. When the instructions are executed by the processor 71, the method for predicting colour component as described in one or more abovementioned embodiments is executed.

It is to be noted that, in practical applications, each component in the terminal is coupled together through the communication bus 73. It can be understood that the communication bus 73 is configured to implement connection communication between these components. The communication bus 73 includes a data bus, and further includes a power bus, a control bus, and a state signal bus. However, for clear description, various buses in FIG. 7 are marked as the communication bus 73.

Figure 8:
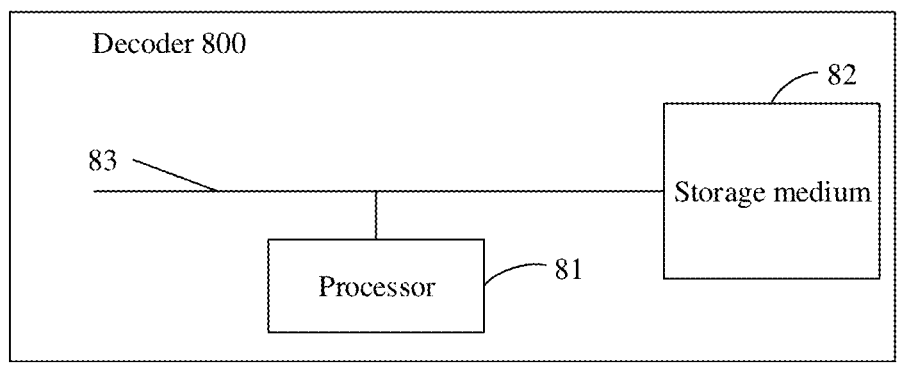
FIG. 8 is another optional structure diagram of a decoder according to some embodiments of the application.

FIG. 8 is another optional structure diagram of a decoder according to embodiment of the application. As shown in FIG. 8, the decoder 800 disclosed in the embodiments of the application may further include a processor 81 and a storage medium 82 storing instructions executable for the processor 81. The storage medium 82 executes operations dependently on the processor 81 through a communication bus 83. When the instructions are executed by the processor 81, the colour component prediction method as described in one or more abovementioned embodiments is executed.

It is to be noted that, in practical applications, each component in the terminal is coupled together through the communication bus 83. It can be understood that the communication bus 83 is configured to implement connection communication between these components. The communication bus 83 includes a data bus, and further includes a power bus, a control bus, and a state signal bus. However, for clear description, various buses in FIG. 8 are marked as the communication bus 83.

The embodiments of the application provide a computer storage medium, which stores executable instructions. When the executable instructions are executed by one or more processors, the one or more processors execute the method for predicting colour component as described in one or more abovementioned embodiments.

It can be understood that the memory in the embodiments of the application may be a volatile memory or a nonvolatile memory, or may include both the volatile and nonvolatile memories. The nonvolatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DRRAM). It is to be noted that the memory of a system and method described in the disclosure is intended to include, but not limited to, memories of these and any other proper types.

The processor may be an integrated circuit chip with a signal processing capability. In an implementation process, each step of the method may be completed by an integrated logic circuit in a hardware form in the processor or an instruction in a software form. The processor may be a universal processor, a Digital Signal Processor (DSP), an Application Specific Integrated Circuit (ASIC), a Field Programmable Gate Array (FPGA) or another Programmable Logic Device (PLD), a discrete gate or transistor logic device, and a discrete hardware component. Each method, step and logical block diagram disclosed in the embodiments of the application may be implemented or executed. The universal processor may be a microprocessor or the processor may also be any conventional processor, etc. The steps of the method disclosed in combination with the embodiments of the application may be directly embodied to be executed and completed by a hardware decoding processor or executed and completed by a combination of hardware and software modules in the decoding processor. The software module may be in a mature storage medium in this field such as a RAM, a flash memory, a ROM, a PROM or EEPROM, and a register. The storage medium is in a memory, and the processor reads information in the memory and completes the steps of the method in combination with hardware.

It can be understood that these embodiments described herein may be implemented by hardware, software, firmware, middleware, a microcode, or a combination thereof. In case of implementation with the hardware, the processing unit may be implemented in one or more ASICs, DSPs, DSP Devices (DSPDs), PLDs, FPGAs, universal processors, controllers, microcontrollers, microprocessors, other electronic units configured to execute the functions in the application or combinations thereof.

In case of implementation with the software, the technology of the disclosure may be implemented through the modules (for example, processes and functions) executing the functions in the disclosure. A software code may be stored in the memory and executed by the processor. The memory may be implemented in the processor or outside the processor.

It is to be noted that terms "include" and "contain" or any other variant thereof is intended to cover nonexclusive inclusions herein, so that a process, method, object or device including a series of elements not only includes those elements but also includes other elements which are not clearly listed or further includes elements intrinsic to the process, the method, the object or the device. Under the condition of no more limitations, an element defined by the statement "including a/an . . . " does not exclude existence of the same other elements in a process, method, object or device including the element.

The sequence numbers of the embodiments of the application are adopted not to represent superiority-inferiority of the embodiments but only for description.

From the above descriptions about the implementation modes, those skilled in the art may clearly know that the method of the abovementioned embodiments may be implemented in a manner of combining software and a necessary universal hardware platform, and of course, may also be implemented through hardware, but the former is a preferred implementation mode under many circumstances. Based on such an understanding, the technical solutions of the application substantially or parts making contributions to the conventional art may be embodied in form of software product, and the computer software product is stored in a storage medium (for example, a ROM/RAM, a magnetic disk, and an optical disk), including a plurality of instructions configured to enable a computer (which may be a personal computer, a server, a network device, etc.) to execute the method in each embodiment of the application.

The embodiments of the application are described above in combination with the drawings, but the application is not limited to the abovementioned specific implementation modes. The abovementioned specific implementation modes are not restrictive but only schematic, those of ordinary skill in the art may be inspired by the application to implement many forms without departing from the purpose of the application and the scope of protection of the claims, and all these shall fall within the scope of protection of the application.

INDUSTRIAL APPLICABILITY

The embodiments of the application provide a method for predicting colour component, a coder, and a computer storage medium, including that: the chroma components are coded in colour component coding, and the prediction value of the luma component is acquired according to the coded chroma components. The prediction accuracy of the luma component may be improved, and the prediction value of the luma component is more approximate to a real pixel value of the luma component.

The invention claimed is:

1. A method for decoding colour components, comprising:
acquiring a prediction value of a luma component;
performing an up-sampling process on the prediction value of the luma component to obtain a processed prediction value of the luma component;
decoding a first chroma component; and
determining a second chroma component according to the first chroma component,
wherein the method further comprises:
determining a parameter of a prediction mode; and
acquiring the prediction value of the luma component by using the prediction model.

2. The method of claim 1, wherein the first chroma component is a blue chroma component and the second chroma component is a red chroma component.

3. The method of claim 1, the first chroma component is a red chroma component and the second chroma component is a blue chroma component.

4. The method of claim 1, wherein the prediction model is a linear model.

5. The method of claim 1, wherein the prediction model is a non-linear model.

6. A decoder, comprising:
a processor and a non-transitory storage medium storing instructions executable by the processor,
wherein when the instructions are executed by the processor, the processor is configured to:
acquire a prediction value of a luma component;
perform an up-sampling process on the prediction value of the luma component to obtain a processed prediction value of the luma component;
decode a first chroma component; and
determine a second chroma component according to the first chroma component,
wherein the processor is further configured to:
determine a parameter of a prediction mode; and
acquire the prediction value of the luma component by using the prediction mode.

7. The decoder of claim 6, wherein the first chroma component is a blue chroma component and the second chroma component is a red chroma component.

8. The decoder of claim 6, wherein the first chroma component is a red chroma component and the second chroma component is a blue chroma component.

9. The decoder of claim 6, wherein the prediction model is a linear model.

10. The decoder of claim 6, wherein the prediction model is a non-linear model.

11. A non-transitory computer-readable storage medium, storing executable instructions, wherein when the executable instructions are executed by one or more processors, the one or more processors are configured to perform:
acquiring a prediction value of a luma component;
performing an up-sampling process on the prediction value of the luma component to obtain a processed prediction value of the luma component;
decoding a first chroma component; and
determining a second chroma component according to the first chroma component,
wherein the one or more processors are further configured to perform:
determining a parameter of a prediction mode; and
acquiring the prediction value of the luma component by using the prediction model.

12. The non-transitory computer-readable storage medium of claim 11, wherein the first chroma component is a blue chroma component and the second chroma component is a red chroma component; or the first chroma component is a red chroma component and the second chroma component is a blue chroma component.

* * * * *